(12) United States Patent
Doehla et al.

(10) Patent No.: US 7,131,316 B2
(45) Date of Patent: Nov. 7, 2006

(54) METHOD AND APPARATUS FOR TESTING AIR PERMEABLE WATERPROOF GLOVES

(75) Inventors: James R. Doehla, Pleasant Hill, MO (US); James Wagner, Glenwood Springs, CO (US)

(73) Assignee: BHA Group, Inc., Kansas City, MO (US)

( * ) Notice: Subject to any disclaimer, the term of this patent is extended or adjusted under 35 U.S.C. 154(b) by 17 days.

(21) Appl. No.: 11/017,897

(22) Filed: Dec. 21, 2004

(65) Prior Publication Data

US 2006/0130559 A1 Jun. 22, 2006

(51) Int. Cl.
*G01M 3/02* (2006.01)
(52) U.S. Cl. .................................. 73/37; 73/40
(58) Field of Classification Search .................. 73/37, 73/40
See application file for complete search history.

(56) References Cited

U.S. PATENT DOCUMENTS

| | | | |
|---|---|---|---|
| 3,603,138 A * | 9/1971 | Peterson | 73/37 |
| 3,991,604 A * | 11/1976 | Hayes et al. | 73/37 |
| 4,317,376 A * | 3/1982 | Fitzpatrick | 73/861.55 |
| 4,776,209 A * | 10/1988 | Patchel | 73/45.5 |
| 5,728,340 A * | 3/1998 | Dreibelbis et al. | 264/216 |
| 6,164,122 A * | 12/2000 | Sisbarro et al. | 73/45 |
| 2004/0149014 A1* | 8/2004 | Castro et al. | 73/37 |

FOREIGN PATENT DOCUMENTS

| GB | 2234596 A | * | 2/1991 |
|---|---|---|---|
| JP | 7-294366 A | * | 11/1995 |

* cited by examiner

*Primary Examiner*—Daniel S. Larkin

(57) ABSTRACT

A dry testing method for a glove (10) made with an air permeable, waterproof material (16). The stem (22) of a tee fitting (24) is connected to an air pump (20) source. A mouth (30) of the glove is tightly attached to one end (32) of the fitting so no air can escape through the mouth. An airflow meter (26) or air pressure gauge connects to another end (28) of the fitting. When the air pump is running, the glove inflates with air and a backpressure is created. The flow meter is read to determine the backpressure level in the inflated glove, the glove being accepted if the meter registers at least a predetermined value indicating the glove does not leak water, but the glove being rejected if the meter reading is less than the predetermined value.

17 Claims, 1 Drawing Sheet

METHOD AND APPARATUS FOR TESTING AIR PERMEABLE WATERPROOF GLOVES

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

This invention relates to the manufacture of waterproof gloves utilizing a layer of an air permeable material; and, more particularly, to a method and apparatus for dry testing the glove to determine if it is waterproof.

Certain types of gloves, for example, waterproof gloves, are made using an air permeable material sandwiched between an inner and an outer layer of material. This material, while preventing water from leaking into the glove, allows airflow through the glove. During manufacture of the glove, it sometimes happens that a hole is punched in the material, that a seam is not properly sewn, or that rip or tear is created. Any of these occurrences renders the glove unsuitable for sale so that it has to be reworked or discarded.

Glove manufacturers test their gloves for water leaks. Conventionally, glove testing requires filling the glove with water and watching for leakage through the outer layer of the glove. While effective, the test requires that the glove gets wet and it subsequently has to be dried. This adds an additional process step to the glove manufacture and adds to the cost of the glove. Further, when a glove dries, it may wrinkle and become misshapen so a secondary operation is necessary to get rid of the wrinkles and insure the glove has a suitable appearance before being packaged for sale. This adds an additional process step and further increases costs.

BRIEF SUMMARY OF THE INVENTION

Briefly stated, the present invention is directed to a method and apparatus for dry testing a waterproof glove having an intermediate layer of an air permeable material to determine if the glove is waterproof. A glove test fixture includes a tee fitting and the stem of the tee is connected to a source of pressurized air such as an air pump. The mouth of the glove is tightly attached to one outlet end of the tee, so no air can escape through the mouth, and an airflow meter is connected to a second outlet end of the tee, so there are parallel flow paths through the test fixture. When the air pump is running, the glove is inflated with air and a backpressure is created. If the glove does not leak, this is indicated by the flow meter registering a first predetermined value, and the glove is considered to be waterproof and acceptable. However, if the meter registers less than the predetermined value, it indicates that the glove would leak water and should be rejected.

The foregoing and other objects, features, and advantages of the invention will be in part apparent and in part pointed out hereinafter.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

Figure 1:
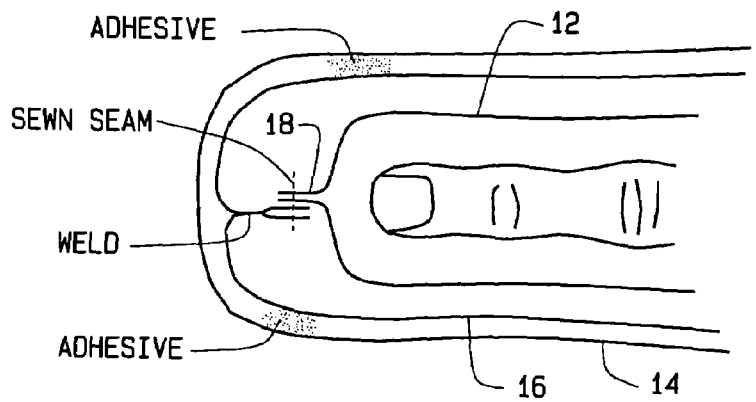
FIG. 1 is a sectional view of a glove showing an intermediate layer of an air permeable, waterproof material.

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Referring to the drawings, the present invention is directed to dry testing of a waterproof glove to ascertain if the glove would leak in use. If the test indicates the glove would not leak, it is accepted for sale. If the test indicates it would leak, the glove is rejected.

In FIG. 1, a glove 10 is shown to comprise an inner layer 12, an outer layer 14, and an intermediate layer 16. Layer 16 is an air permeable, waterproof material that is sewn in place between the inner and outer layers. It will be understood that glove 10 could have more than one intermediate layer, for example, a layer of an insulating material (not shown). During manufacture, the layers are positioned over one another and stitched or sewn together. This results in a seam 18 being formed about the circumference of the glove. The seam or stitching is also typically sealed or taped.

When completed, the glove is tested to make sure that water will not get into the glove during normal usage. As noted, this has been done by filling the glove with water and inspecting the outside of the glove for leakage through an enlarged hole in material 16, or an incomplete or torn seam 18, or a leak about or through the seam tape or seal. If water would flow from the inside to the outside of the glove, it will readily flow in the opposite direction as well.

In accordance with the present invention, a method for dry testing the glove involves pumping pressurized air into the glove and testing for air leakage. Those skilled in the art will understand that even an acceptable glove has some air leakage. However, for purposes of this invention, an unacceptable leak will be understood to mean that the glove passes air above a predetermined amount, or that the backpressure created when the glove is inflated with air remains below a predetermined level.

Figure 2:
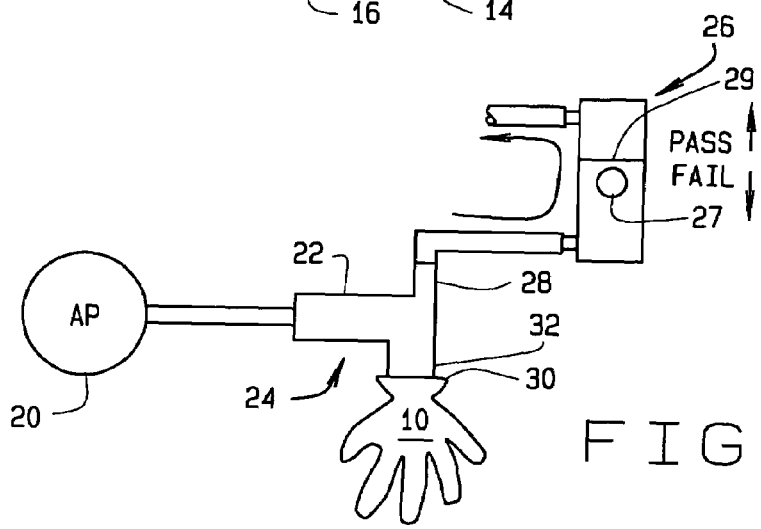
FIG. 2 illustrates a test set-up for dry testing of a completed glove to determine if it would leak water; and, FIG. 3 illustrates a test set-up for simultaneously testing a quantity of gloves.

Referring to FIG. 2, a source of pressurized air such as an air pump (AP) 20 is connected to a test fixture; i.e., to the stem 22 of a tee fitting 24. An airflow meter 26 is connected to one branch 28 of the tee, and the open, mouth end 30 of glove 10 is sealed around the end of the other branch 32 of the tee, or attached with a clamping device. For this purpose, the diameter of the tee is only slightly smaller than the opening formed by the glove mouth. This would allow, for example, the test operator to grasp the mouth end of the glove, and squeeze or compress it, by hand, around the end of branch 32 of the tee. When the air pump is turned "on", air will flow through tee 24 to both glove 10 and meter 26. The amount of airflow is a function of the relative diameters of the branches 28 and 32, it being understood that branch 32 is typically larger in diameter than branch 28. Regardless, when pump 20 is turned on, glove 10 will inflate and a certain amount of backpressure is created. The amount of backpressure is an indication of whether or not the glove is acceptable. If there are no holes, rips, tears, or incomplete seams, the backpressure will be higher than if there are. Meter 26 measures this level of backpressure by registering the amount of air flowing through branch 28. The higher the backpressure, the greater the air flow through branch 28, the lower the backpressure, the less airflow. In FIG. 2, flowmeter 26 is a graduated cylinder in which airflow through the cylinder lifts a ball 27. If the ball rises to or above a specified level 29, the glove is acceptable; but if the ball does not reach that height, the glove fails.

While some air will flow through the air permeable material 16, if there are no oversize holes in the material, no rips or tears in seam 18, and if the seam is complete, the amount of airflow will be less than if there is an oversize hole, rip, tear, or incomplete seam. From previous testing, the pass/fail level 29 of meter 26 is established. Accordingly, if ball 27 reaches or rises above this predetermined level, the glove is acceptable. However, if ball 27 fails to reach level 29, it is indicative that the glove will leak water, and the glove is rejected. When the test is complete, the air pump is turned "off", and glove 10 is removed from the test fixture and placed in an "acceptable" or "reject" bin for further processing.

Those skilled in the art will understand that an air pressure gauge can be used instead of a flowmeter. When an air pressure gauge is used, the glove will be considered waterproof if the backpressure is such that the gauge measures at least a predetermined value. However, if the backpressure is such that the gauge does not measure at least the predetermined value, the glove is considered not to be waterproof.

Figure 3:
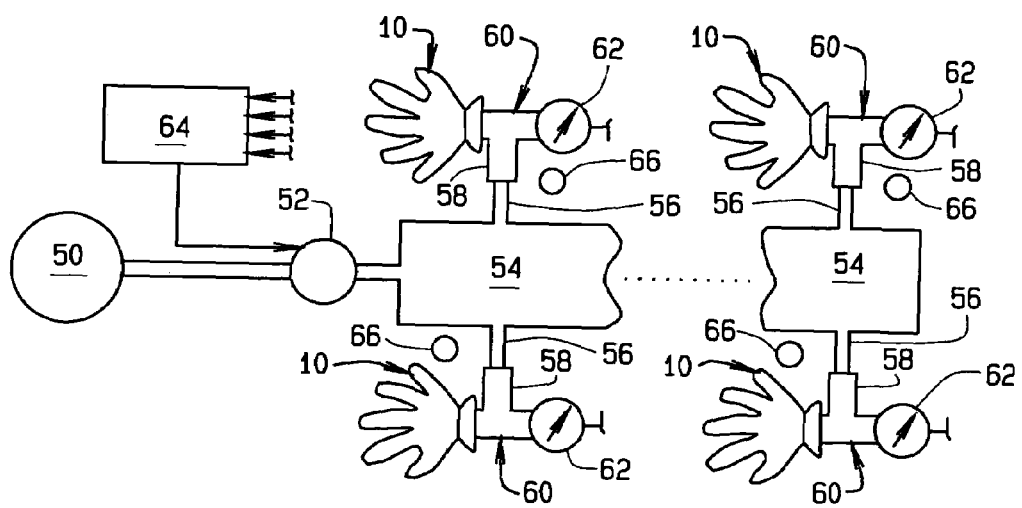

Referring to FIG. 3, for simultaneous testing of a large number of gloves, a source 50 of pressurized air is connected through a flow control valve 52 to one end of a manifold 54. Each outlet 56 of the manifold connects to a separate test fixture for each glove; i.e., to a stem 58 of a tee 60. An airflow meter 62 attaches to one branch of the tee, and the mouth a glove 10 is connected to the other branch of the tee; by clamping it in place, for example. When valve 52 is activated, all of the gloves are simultaneously inflated and each flowmeter 62 provides a reading indicative of the backpressure in its associated glove.

Those skilled in the art will understand that the dry testing method of FIG. 3 can be an automated process run by a controller 64. The controller is responsive to an indication that all the gloves 10 being tested at any one time are in place before activating valve 52 to pressurize the gloves. The controller is further responsive to input signals from each flow meter representing airflow through the meter. The controller is programmed to automatically compare each flow meter reading against a predetermined value and to provide an "accept/reject" status indication at an indicator 66 at each test station so the glove 10, when removed from the test fixture at that station, is placed in an appropriate bin. Further controller 64 will record and store test data for future use by the manufacturer.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A dry testing method for a glove (10) made with an air permeable, waterproof material (16) comprising: p1 mounting the glove on a test fixture (24) to which is connected a source (20) of pressurized air; p1 activating the air source to inflate the glove with air, a backpressure being created in the glove when inflated; and p1 measuring the backpressure level as a function of airflow through a metering means (26) also connected to the test fixture whereby if the glove is waterproof the backpressure will be such that airflow through the metering means reaches at least a predetermined level, but if the glove is not waterproof, the backpressure will be such that airflow through the metering means does not attain the predetermined level, the test fixture includinci a tee fitting, the source of pressurized air being connected to an inlet end (22) of the fitting. and the glove and metering means connected to respective outlet ends (32, 28) of the fitting.

2. The method of claim 1 further including mounting the glove onto the fitting by squeezing the mouth of the glove, by hand, over the outlet end of the fitting on which it the glove is to be mounted.

3. The method of claim 2 in which the outlet end of the fitting on which the glove is mounted is larger in size than the outlet of the fitting to which the metering means is connected.

4. The method of claim 1 in which the outlet ends of the fitting are each the same size.

5. The method of claim 1 in which the source of air is an air pump.

6. The method of claim 1 in which the metering means is a flowmeter having a graduated cylinder in which air flow through the cylinder lifts a ball; if the ball rises above a specified height, the glove is acceptable, but if the ball does not reach that height, the glove is rejected.

7. The method of claim 1 in which the metering means is an air pressure gauge.

8. A method for simultaneously dry testing a plurality of gloves (10) made with an air permeable, waterproof material (16) comprising:

connecting a source (50) of pressurized air to an air inlet end of a manifold (54) having a plurality of air outlets (56);

connecting each air outlet to an air inlet end of a fitting (60);

connecting a glove (10) to a first air outlet end of each fitting;

attaching an airflow meter (62) to a second air outlet end of each fitting;

flowing air through the manifold to simultaneously inflate all of the gloves with air, a backpressure being created in each glove when inflated;

determining the quality of each glove as a function of the backpressure level in the glove whereby if the backpressure is of a predetermined level the glove is waterproof and acceptable, but if the backpressure is less than the predetermined level, the glove will leak, is not waterproof, and is unacceptable, such determining being made by reading the flowmeter to determine the backpressure level created in the inflated glove, the glove being accented if the meter registers at least a predetermined value indicating the glove does not leak but the glove being rejected if the meter reading is less than the predetermined value.

9. The method of claim 8 further including automatically flowing air through the manifold.

10. The method of claim 8 further including automatically comparing each flow meter reading against a predetermined value and providing a separate "accept/reject" status indication for each glove.

11. The method of claim 10 further including recording and storing the results of the tests.

12. The method of claim 10 including a controller (64) for automatically controlling performance of a test.

13. The method of claim 8 further including attaching an air pressure gauge to a second air outlet end of each fitting and reading the gauge to determine the backpressure level created in the inflated glove, the glove being accepted if the gauge registers at least a predetermined value indicating the glove does not leak but the glove being rejected if the gauge registers less than the predetermined value.

14. Apparatus for dry testing a glove (10) made with an air permeable, waterproof material (16) comprising:
   a text fixture (24) on which the glove is mounted;
   a source (20) of pressurized air to which the test fixture is connected, the glove being inflated by pressurized air when the air source is activated with a backpressure being created in the glove; and
   means (26) also connected to the test fixture for measuring the backpressure level whereby if the glove is waterproof the backpressure will be such that said means measures at least a predetermined value, but if the glove is not waterproof, the backpressure will be such that said means does not attain the predetermined value, the test fixture being a tee fitting with the source of pressurized air connected to an inlet end (22) of the fitting and the glove and said means to respective outlet ends (32, 28) of the fitting.

15. The apparatus of claim 14 in which said means is a flowmeter.

16. The apparatus of claim 14 in which said means is an air pressure gauge.

17. The apparatus of claim 14 in which the source of pressurized air is an air pump.

* * * * *